United States Patent
Liu

(10) Patent No.: US 11,977,724 B2
(45) Date of Patent: May 7, 2024

(54) INFORMATION PROCESSING METHOD AND ELECTRONIC DEVICE

(71) Applicant: Lenovo (Beijing) Limited, Beijing (CN)

(72) Inventor: Xiao Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/677,980

(22) Filed: Feb. 22, 2022

(65) Prior Publication Data

US 2023/0099874 A1    Mar. 30, 2023

(30) Foreign Application Priority Data

Sep. 30, 2021    (CN) .......................... 202111162926.7

(51) Int. Cl.
    *G06F 3/048*      (2013.01)
    *G06F 3/04845*      (2022.01)
    *G06F 3/04847*      (2022.01)
    *G06F 3/04842*      (2022.01)

(52) U.S. Cl.
    CPC ...... *G06F 3/04845* (2013.01); *G06F 3/04847* (2013.01); *G06F 3/04842* (2013.01)

(58) Field of Classification Search
    CPC ............. G06F 3/04845; G06F 3/04847; G06F 3/04842
    See application file for complete search history.

(56) References Cited

U.S. PATENT DOCUMENTS

| | | | | |
|---|---|---|---|---|
| 9,811,250 | B2* | 11/2017 | Louch | G06F 9/451 |
| 9,933,922 | B2* | 4/2018 | Ye | G06F 3/0481 |
| 10,521,110 | B2* | 12/2019 | Lee | G06F 3/0484 |
| 2012/0246586 | A1* | 6/2012 | Heo | G06F 9/451 |
| | | | | 345/156 |
| 2012/0299814 | A1* | 11/2012 | Kwon | G06F 9/451 |
| | | | | 345/156 |
| 2014/0149894 | A1* | 5/2014 | Watanabe | H04N 1/00432 |
| | | | | 715/761 |
| 2016/0041698 | A1* | 2/2016 | Tkach | G06F 3/0482 |
| | | | | 715/765 |
| 2016/0077724 | A1* | 3/2016 | Lee | H04M 1/72451 |
| | | | | 715/703 |
| 2017/0105053 | A1* | 4/2017 | Todd | H04N 21/4438 |
| 2021/0286510 | A1* | 9/2021 | Tyler | G06F 3/0488 |
| 2022/0385776 | A1* | 12/2022 | Ikuma | G06F 3/04886 |
| 2023/0236708 | A1* | 7/2023 | Xiao | G06F 3/0484 |
| | | | | 715/810 |

\* cited by examiner

*Primary Examiner* — Mahelet Shiberou
(74) *Attorney, Agent, or Firm* — ANOVA LAW GROUP, PLLC

(57) ABSTRACT

An information processing method includes determining a target area associated with a plurality of widgets that are different, determining a target display mode of the target area, and displaying the plurality of widgets in the target area based on the target display mode. Each of the plurality of widgets obtains a display content based on a target address, and the plurality of widgets are displayed differently in the target area under different display modes.

14 Claims, 15 Drawing Sheets

Automatically
Switch Widgets

○ Alarm

○ Whether, Exercise

○ Today's weather

○ Traffic

○ Schedule

○ Alarm

○ Express Delivery &
  other notifications

INFORMATION PROCESSING METHOD AND ELECTRONIC DEVICE

CROSS-REFERENCE TO RELATED APPLICATION

This application claims priority to Chinese Application No. 202111162926.7, filed on Sep. 30, 2021, the entire contents of which are incorporated herein by reference.

FIELD OF THE DISCLOSURE

The present disclosure generally relates to the field of information display technology and, more particularly, to an information processing method and electronic device.

BACKGROUND

Desktop widgets have been gradually applied to mobile phone systems. In conventional technologies, a specific area is set and one or more widgets are stacked in the specific area. However, when the widget is displayed in the specific area, merely one widget can be displayed in the display area at a time. When the user needs to view multiple widgets, the displayed widgets need to be switched back and forth, which is complicated to operate.

SUMMARY

In accordance with the disclosure, there is provided an information processing method including determining a target area associated with a plurality of widgets that are different, determining a target display mode of the target area, and displaying the plurality of widgets in the target area based on the target display mode. Each of the plurality of widgets obtains a display content based on a target address, and the plurality of widgets are displayed differently in the target area under different display modes.

Also in accordance with the disclosure, there is provided an electronic device including a memory storing an information processing program and a processor configured to execute the information processing program to determine a target area associated with a plurality of widgets that are different, determine a target display mode of the target area, and display the plurality of widgets in the target area based on the target display mode. Each of the plurality of widgets obtains the display content based on the target address, and the plurality of widgets are displayed differently in the target area under different display modes.

DETAILED DESCRIPTION OF THE EMBODIMENTS

In order to provide a clear illustration of the present disclosure, embodiments of the present disclosure are described with reference to the drawings. It can be appreciated that the embodiments described herein are merely for illustrating the present disclosure, but not intended to limit the present disclosure.

The present disclosure provides an information processing method and an electronic device to solve a problem of complex operations when viewing multiple widgets, and reduce a complexity of operations when viewing the widgets.

Figure 1:
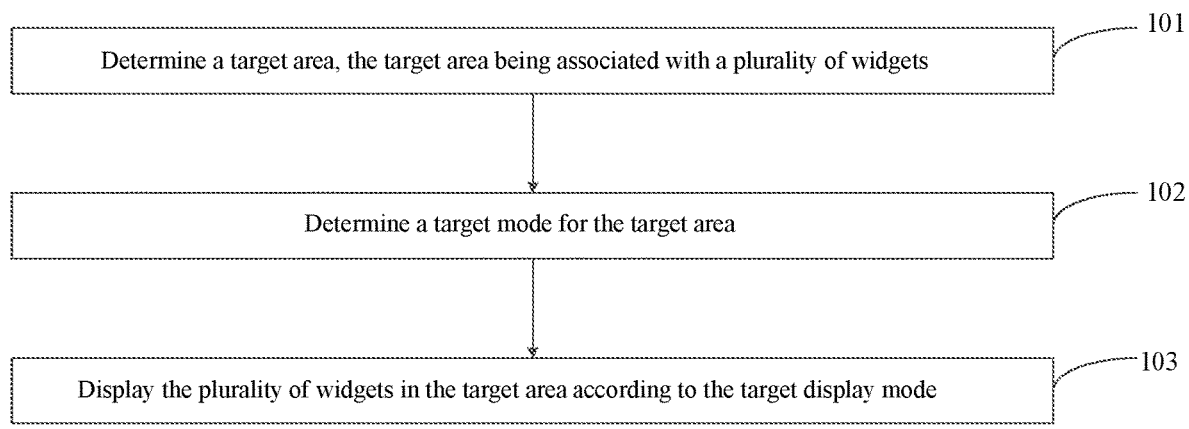
FIG. 1 is a schematic flowchart of an information processing method according to an embodiment of the disclosure.

FIG. 1 is a schematic flowchart of the information processing method consistent with the disclosure. The method can be applied to the electronic device. As shown in FIG. 1, at 101, a target area is determined and the target area is associated with a plurality of widgets. The plurality of widgets can be different, and each widget can obtain a display content according to a target address. The target address can include an update address of a function module corresponding to the widget, and an update content of the widget can be obtained and displayed according to the update address. The target area may include an area determined on a display interface of the electronic device at least according to a size of the widget when being displayed. A widget refers to an application used for adding the display content to the target area.

In some embodiments, a candidate area may be determined in an idle area of the display interface of the electronic device, and the target area not smaller than a maximum size of the widget when being displayed can be determined from the candidate area according to the size of the widget when being displayed.

The target area can be associated with the plurality of widgets. In some embodiments, a user's association operation can be received, and the plurality of widgets may be determined according to an identifier of the widget carried in the association operation. In some other embodiments, the electronic device can determine widgets having use frequencies greater than a target frequency from the widgets of the electronic device according to the user's historical use frequency of each widget. The user's historical use frequency of each widget may be determined from historical display records of the widgets.

In some embodiments, the widget can include a desktop widget. The widget can include, but is not limited to, a desktop calendar and a desktop clock of a mobile phone desktop, or detailed information of music played in the background.

At 102, a target display mode for the target area is determined. The target display mode refers to a mode in which the plurality of widgets are displayed in the target area, and the target display mode can at least include displaying at least two widgets at a time in the target area.

In some embodiments, determining the target display mode of the target area can include, but is not limited to, determining the target display mode according to a user's selection operation or determining the target display mode by the electronic device after analyzing the historical display records of the plurality of widgets.

In some embodiments, a selection box having at least two display modes can be displayed in the target area of the electronic device, the user can perform the selection operation according to actual needs, and the electronic device can receive the user's selection operation and determine the target display mode based on the selection operation.

Consistent with the disclosure, the user can choose the target display mode according to their own needs, and the electronic device can also automatically determine the target display mode. It is not limited to displaying merely one widget at a time, thereby providing the user with multiple choices, improving a convenience for the user to view the widgets, and reducing an operational complexity when viewing the widgets.

At 103, the plurality of widgets are displayed in the target area according to the target display mode. In different target display modes, the plurality of widgets can be displayed in different manners in the target area.

In some embodiments, each display mode has the corresponding display manner. After the target display mode is determined, the target display manner corresponding to the target display mode may be determined according to the target display mode, and when the target area is in the target display mode, the plurality of widgets can be displayed in the target display manner.

Consistent with the disclosure, the information processing method can determine the target area, and the target area can be associated with the plurality of widgets. The plurality of widgets can be different, and each widget can obtain the display content according to the target address. The target display mode of the target area can be determined and the plurality of widgets in the target area can be displayed in the target area based on the target display mode. In different target display modes, the plurality of widgets can be displayed in different manners in the target area. As such, according to the determined target display mode, the plurality of widgets can be displayed in the target area. Unlike the conventional technologies, which merely one widget is displayed at a time in the display area, thereby causing a problem of complex operation when the user is viewing the widgets, the method consistent with the disclosure can reduce the operational complexity when the user is viewing the widgets.

Figure 2:
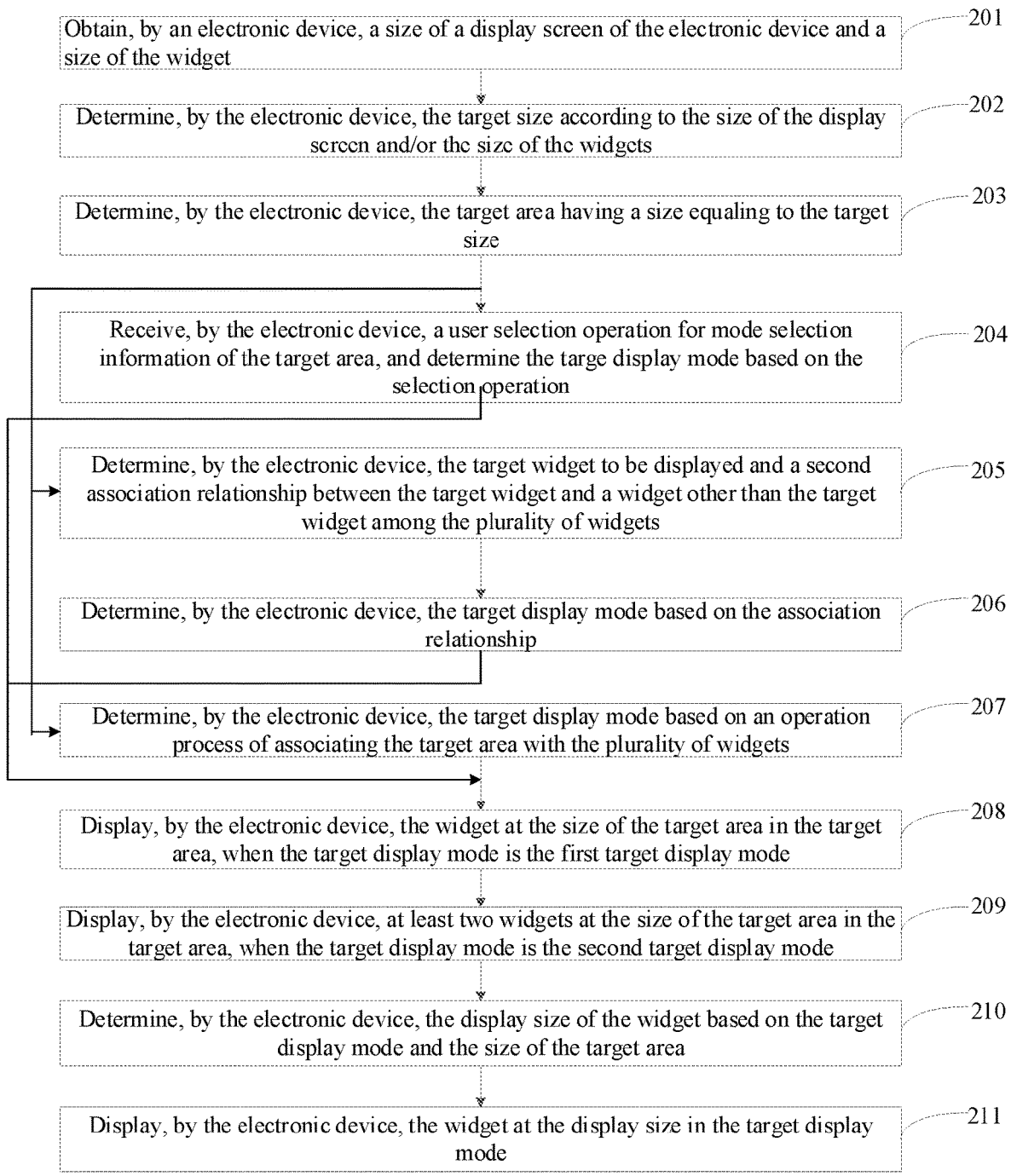
FIG. 2 is a schematic flowchart of another information processing method according to an embodiment of the disclosure.

FIG. 2 is a schematic flowchart of another information processing method consistent with the disclosure. As shown in FIG. 2, at 201, the electronic device obtains a size of a display screen of the electronic device and a size of the widget. The size of the widget refers to the size of the widget when being displayed.

In some embodiments, the electronic device can obtain its hardware configuration parameters. According to an identification (ID) of the display screen, the configuration parameters of the display screen corresponding to the ID of the display screen can be determined from the hardware configuration parameters, and the size of the display screen can be determined according to the configuration parameters of the display screen. The size of the widget can be obtained by the electronic device from the configuration module corresponding to the widget, and the size of the widget may include several selections.

At 202, the electronic device determines the target size according to the size of the display screen and/or the size of the widgets.

In some embodiments, the target size can be determined as the size of the display screen based on the size of the display screen, the target size can further be determined as the maximum size supported by the widget when being display based on the size of the widget, the target size can also be calculated based on the size of the display screen and the maximum size supported by the widget. In some embodiments, the target size can be represented by a target length and a target width. The electronic device can determine the target length by averaging a length of the display screen and a length of the widget when being displayed, and determine the target width by averaging a width of the display screen and a width of the widget when being displayed. The length/width of the widget when being displayed refers to the length/width of the widget when the widget is displayed at the maximum supported size.

At 203, the electronic device determines the target area having a size equal to the target size. According to the determined target size, the electronic device can determine an area having the size equal to the target size in the display area of the electronic device and set the area as the target area.

At 204, the electronic device receives a user selection operation with respect to mode selection information of the target area, and determines the target display mode based on the selection operation.

In some embodiments, the target area can display the mode selection information, and the mode selection information can include the plurality of display modes, and the user can perform the selection operation according to the plurality of display modes. The electronic device may receive the user's selection operation, and determine the target display mode based on the user's selection operation.

For example, the mode selection information may include Mode A and Mode B, the user may perform the selection operation by clicking Mode A, and the electronic device may determine Mode A as the target display mode according to the user's selection operation.

At 205, the electronic device determines the target widget to be displayed, and determines a second association relationship between the target widget and a widget other than the target widget among the plurality of widgets.

The target widget to be displayed can include a widget selected by the user from the plurality of widgets, or a widget determined by the electronic device after analyzing the historical display records of the plurality of widgets. The second association relationship may be determined after analyzing the target widget, or may be determined according to a preset first association relationship between each widget. The second association relationship can indicate whether the target widget is related to the widget other than the target widget.

For example, the electronic device can obtain the historical display records of the plurality of widgets, and analyze the historical display records to determine that the widget with a highest display frequency at the current moment is a music widget. Thus, the music widget can be determined as the target widget, and the second association relationship between the music widget and the widget other than the music widget among the plurality of widgets can be determined.

At 206, the electronic device determines the target display mode based on the association relationship.

When the second association relationship indicates that the target widget has no relations with any widget other than the target widget among the plurality of widgets, the target display mode may be determined to be the first target display mode. When the second association relationship indicates that the target widget is related to the widget other than the target widget among the plurality of widgets, the target display mode can be determined as the second target display mode. The first target display mode and the second target display mode can be different.

In some embodiments, if the target widget is determined as a to-do list widget, the to-do list widget can be analyzed. When the widget associated with the to-do list widget is determined as a time widget, the target display mode can be determined as the second target display mode, and the to-do list widget and the time widget can be displayed simultaneously in the second target display mode. The user does not need to switch back and forth, and the display can actively show the widgets that the user wants to display at this time. That is, the electronic device can learn the user behaviors and display the widgets intelligently for users.

In some embodiments, the target display mode can be determined according to the number of target widgets. When the number of target widgets is determined as one, the target display mode can be determined as the first target display mode, and when the number of target widgets is determined to be more than one, the target display mode can be determined as the second target display mode.

At 207, the electronic device determines the target display mode based on an operation process of associating the target area with the plurality of widgets.

The operation process of associating the target area with the plurality of widgets may refer to an operation process of the user adding the target widget to be displayed to the target area, and the electronic device may determine the target display mode according to a user's trigger operation during the operation process.

For example, the processes at 207 can be achieved as follows.

At a1, if the target area is in an editing mode, the electronic device can determine a stay position for adding an application (app) ID of the target widget to the target area.

In some embodiments, the user can perform a first trigger operation at a first position of the target area, and the electronic device can control the target area to be in the editing mode based on the first trigger operation. In the editing mode, the user can perform a second trigger operation of adding the app ID of the target widget to the target area. The electronic device may determine, based on the second trigger operation, the stay position of the app ID of the added target widget in the target area, and determine the target display mode according to the area where the stay position is located. The first position refers to a position that can trigger the target area to enter the editing mode. The area where the stay position is located corresponds to the display mode. When the area where the stay position is located is different, and the corresponding display mode can be different.

In some embodiments, if the stay position is in a first area of the target area, the target display mode can be determined as a first target display mode, and if the stay position is in a second area in the target area, the target display mode can be determined as a second target display mode. The first area corresponds to the first target display mode, and the second area corresponds to the second target display mode.

In the editing mode, an app icon for each of the plurality of widgets can be displayed in a specific area other than the target area. The user can display the target widget in the target area by dragging the app icon of the target widget from the specific area to the target area.

At a2, if the stay position coincides with a first edge of the target area, the electronic device can determine that the target display mode is the first target display mode.

The first edge refers to a first edge area of the target area. In some embodiments, if the user's stay position is determined within the first edge area, the target display mode may be determined as the first target display mode, and the plurality of widgets can be displayed in the target area at the first target display mode.

Figure 3:
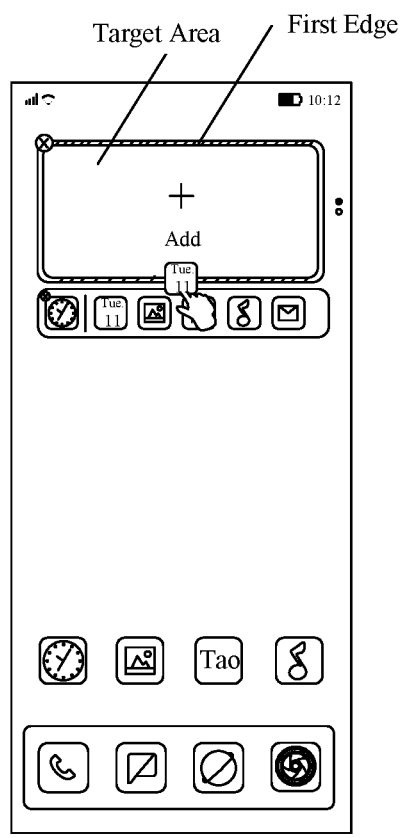
FIG. 3 is a schematic diagram of a display interface of an information processing method according to an embodiment of the disclosure.

FIG. 3 is a schematic diagram of a display interface of the information processing method consistent with the disclosure. In some embodiments, as shown in FIG. 3, when the user drags an icon of the calendar widget to the target area, if the user drags the icon of the calendar widget to the first edge (the first edge is shown as a shaded area in FIG. 3), the target display mode can be determined as the first target display mode.

At a3, if the stay position is within the target area, the electronic device can determine that the target display mode is the second target display mode.

In some embodiments, when the stay position of the app ID of the target widget is within the target area, the target display mode may be determined as the second target display mode, and the plurality of widgets can be displayed in the target area at the second target display mode.

At 208, when the target display mode is the first target display mode, the electronic device can display the widget at the size of the target area in the target area.

The first target display mode can be referred as a mode in which merely one widget is displayed at a time in the target area.

In some embodiments, when the target display mode is the first target display mode, the target widget to be displayed can be determined from the plurality of widgets, and merely the target widget can be displayed at the size of the target area in the target area.

Figure 4:
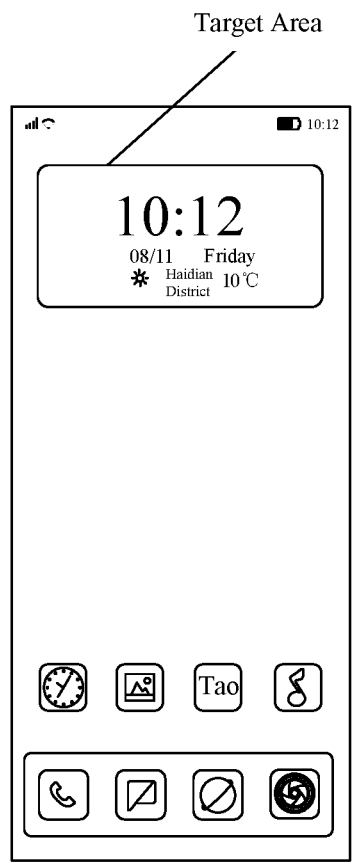
FIG. 4 is a schematic diagram of another display interface of an information processing method according to an embodiment of the disclosure.

FIG. 4 is a schematic diagram of another display interface of the information processing method consistent with the disclosure. For example, as shown in FIG. 4, when the target display mode is determined as the first target mode and the target widget to be displayed is determined to be a weather widget, the weather widget can be displayed at the size of the target area in the target area. The size of the target area can refer to the maximum size supported by the weather widget when being displayed.

At 209, when the target display mode is the second target display mode, the electronic device displays at least two widgets at the size of the target area in the target area.

The second target display mode refers to a mode in which at least two widgets are displayed in the target area at the same time.

In some embodiments, when the target display mode is the second target mode, and the target widgets to be displayed are determined to be at least two widgets, the at least two widgets can be displayed in the target area at the size of the target area.

Figure 5:
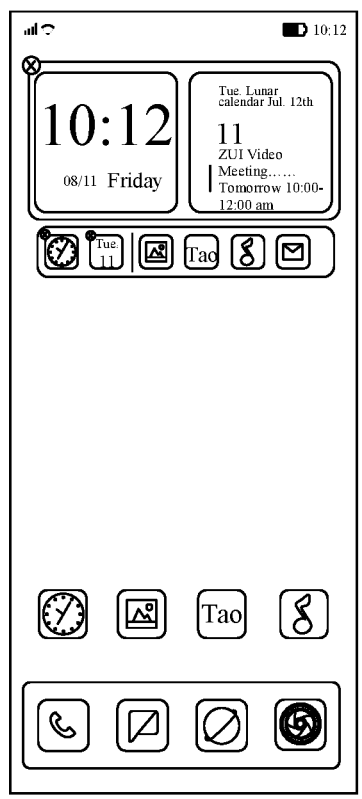
FIG. 5 is a schematic diagram of another display interface of an information processing method according to an embodiment of the disclosure.

FIG. 5 is a schematic diagram of another display interface of the information processing method consistent with the disclosure. For example, as shown in FIG. 5, when the target display mode is the second target display mode, and the target widgets to be displayed are determined the to-do list widget and the time widget, the to-do list widget and the time widget can be displayed simultaneously in the target display area.

For example, the processes at 209 can be achieved as follows.

At b1, when the target display mode is the second target display mode, the electronic device can determine the target display manner based on the stay position and a target division manner.

In some embodiments, when it is determined that the target display mode is the second target display mode, the position of the stay position in a third area can be determined according to the stay position, and the target display manner can be determined according to the position of the stay position in the third area and the target division manner. The third area may be determined according to the stay position. The target division method can include, but is not limited to, a dichotomy method. Target display manner can include, but is not limited to, a top-bottom display manner and a left-right display manner. The third area may include a set of content editing area, and the content editing area may include an area that guides the user to drag and arrange the app icon of the target widget.

Figure 6:
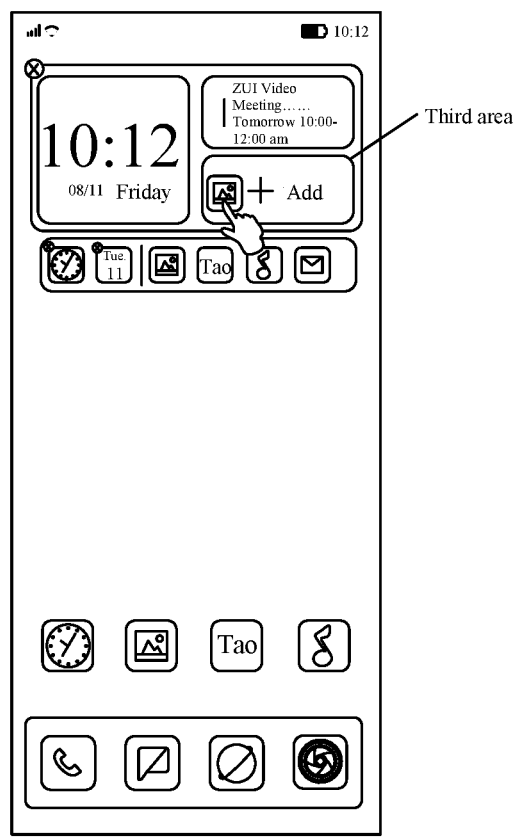
FIG. 6 is a schematic diagram of another display interface of an information processing method according to an embodiment of the disclosure.

FIG. 6 is a schematic diagram of another display interface of the information processing method consistent with the disclosure. For example, as shown in FIG. 6, when the target display mode is the second target display mode, if before the app icon of a video widget is dragged to the target area, the target area already has the to-do list widget and the time widget, the position of the stay position in the third area can be determined according to the stay position of the dragged app icon of the video widget, and the target display manner can be determined based on the target division manner and the position of the stay position in the third area.

If before the app icon of the video widget is dragged to the target area, the target area already has the to-do list widget and the time widget, the area to-be-divided can be determined according to the icon of the target widget dragged by the user, and the widget of the area to-be-divided and the target widget can be displayed according to the determined target display manner. The to-be-divided area may be the same as or different from the third area. When the to-be-divided area is different from the third area, the third area may include a sub-area of the to-be-divided area. In some embodiments, when the user drags the app icon of the video widget to the area where the to-do list widget is located, the area where the to-do list widget is located can be determined as the area to-be-divided. That is, the to-do list widget and the target widget need to be displayed in the area to-be-divided at the same time. The area to-be-divided can be divided into two areas for displaying the to-do list widget and the video widget according to the target division manner and the target display manner. For example, before the app icon of the video widget is dragged, the display size of the to-do list widget is A, then when the to-do list widget and the target widget are displayed in the area to-be-divided at the same time, the display size of the to-do list widget is smaller than A.

In some embodiments, the area to-be-divided can be divided by the dichotomy method. When the stay position is determined to be on the left side of the third area, the to-do list widget and the video widget can be displayed by the upper-lower division manner. When the stay position is on the right side of the third area, the to-do list widget and the video widget can be displayed in the left-right manner.

At b2, the electronic device can display at least two widgets in the target area under the target display manner according to the size of the target area.

In some embodiments, under the second target display mode, the at least two widgets may be displayed in the target area at the size of the target area based on the target display manner.

Figure 7:
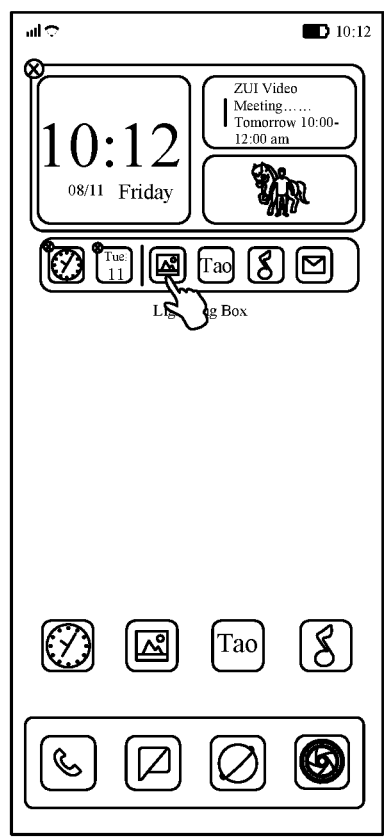
FIG. 7 is a schematic diagram of another display interface of an information processing method according to an embodiment of the disclosure.

FIG. 7 is a schematic diagram of another display interface of the information processing method consistent with the disclosure. For example, when the display method of the target is determined to be the upper-lower division manner, as shown in FIG. 7, the to-do list widget and the video widget can be displayed in the upper-lower division manner.

At 210, the electronic device determines the display size of the widget based on the target display mode and the size of the target area. The display size of the widget is less than or equal to the size of the target area.

In some embodiments, when the target display mode is the first target display mode, the maximum display size supported by the widget when being displayed can be determined as the display size of the widget, and the size of the target area can also be determined as the display size of the widget. When the target display mode is the second target display mode, the display size of the widget can be determined from a plurality of display sizes supported by the widget when being displayed according to the size of the target area.

In some embodiments, when the target display mode is the second target display mode, before the app icon of the video widget is dragged to the target area, the target area already has the to-do list widget and the time widget. The area to-be-divided can be determined according to the app icon of the target widget dragged by the user, and the display size of the widget can be determined according to the size of the area to-be-divided in the target area. Both the display size of the video widget and the display size of the to-do list widget in the area to-be-divided may be less than or equal to a half of the size of the area to-be-divided.

At 211, the electronic device is in the target display mode to display the widgets at the display size.

In the target display mode, the electronic device may display at least one widget in the determined display size. Displaying the widget in the target area with the display size can refer to displaying the display content of the widget in the target area at the display size. When the determined display size is smaller than a minimum display size supported by the widget when being display, the app icon of the widget can be displayed in the target area. The display size supported when the widget's app icon is displayed can be smaller than the display size when the display content of the widget is displayed. The displayed content may be determined according to the target address when the function module corresponding to the widget is updated.

In some embodiments, determining the target display mode of the target area can be achieved at 204, or at 205 to 206, or at 207. The processes at 208 to 211 may be performed after the processes at 204, the processes at 208 to 211 may be performed after the processes at 206, and the processes at 208 to 211 may be performed after the processes at 207.

In some other embodiments, the information processing method may further include the following processes.

At 212, the electronic device receives a switching operation, and based on the switching operation, switches the display mode of the target area from the current first target display mode to the second target display mode, or switches the display mode of the target area from the current second target display mode to the first target display mode.

In some embodiments, switching the display mode of the target area can be achieved manually by the user. For example, the target area can display an icon for switching the display mode. When the user clicks on the icon to perform the switching operation, the electronic device can receive the switching operation and, based on the switching operation, can switch the current display mode of the target area.

In some embodiments, if the current display mode of the target area is the first target display mode, the electronic device can switch the first target display mode to the second target display mode based on the switching operation. If the current display mode of the target area is the second target display mode, the electronic device may switch the second target display mode to the first target display mode based on the switching operation.

At 213, the electronic device switches the display mode of the target area from the current first target display mode to the second target display mode or switches the display mode of the target area from the current second target display mode to the first target display mode, based on the first association relationship between the plurality of widgets.

In some embodiments, the electronic device can determine the target widget to be displayed according to the historical display records of the plurality of widgets. Based on the first association relationship between the plurality of widgets, the second association relationship between the target widget and the widget other than the target widget among the plurality of widgets can be determined, and the display mode of the target area can be automatically switched based on the second association relationship.

The processes at 213 can be achieved by the follows.

At c1, the electronic device can determine the target widget to be displayed, and determine the second association relationship between the target widget and the widget other than the target widget among the plurality of widgets.

The implementation processes at c1 are similar to the implementation processes at 205, and detailed description will be omitted herein.

At c2, when the second association relationship indicates that the target widget is irrelevant to the widget other than the target widget among the plurality of widgets, the electronic device can determine the target display mode as the first target display mode.

In some embodiments, when the second association relationship indicates that the target widget is irrelevant to the widget other than the target widget among the plurality of widgets, merely the target widget can be displayed currently, and the target display mode can be determined as the first target display mode. The number of target widgets can be one.

At c3, when the current display mode of the target area is the second target display mode, the electronic device can switch the second target display mode to the first target display mode.

In some embodiments, after the electronic device switches the second target display mode to the first target display mode, the target widget can be displayed in the target area using the first target display mode.

At c4, when the second association relationship indicates that the target widget is related to the widget other than the target widget among the plurality of widgets, the electronic device can determine the target display mode as the second target display mode.

In some embodiments, when the second association relationship indicates that the target widget is related to the widget other than the target widget among the plurality of widgets, the target widget and the widget related to the target widget can be displayed. Therefore, the target display mode can be determined as the second target display mode.

At c5, when the current display mode of the target area is the first target display mode, the electronic device can switch the first target display mode to the second target display mode.

In some embodiments, the electronic device can switch the first target display mode to the second target display mode, and when the target area is in the second target display mode, the target widget and the widget related to the target widgets can be displayed.

The following will describe in detail the display of the plurality of widgets in the target area under different display modes in combination with application scenarios.

Figure 8:
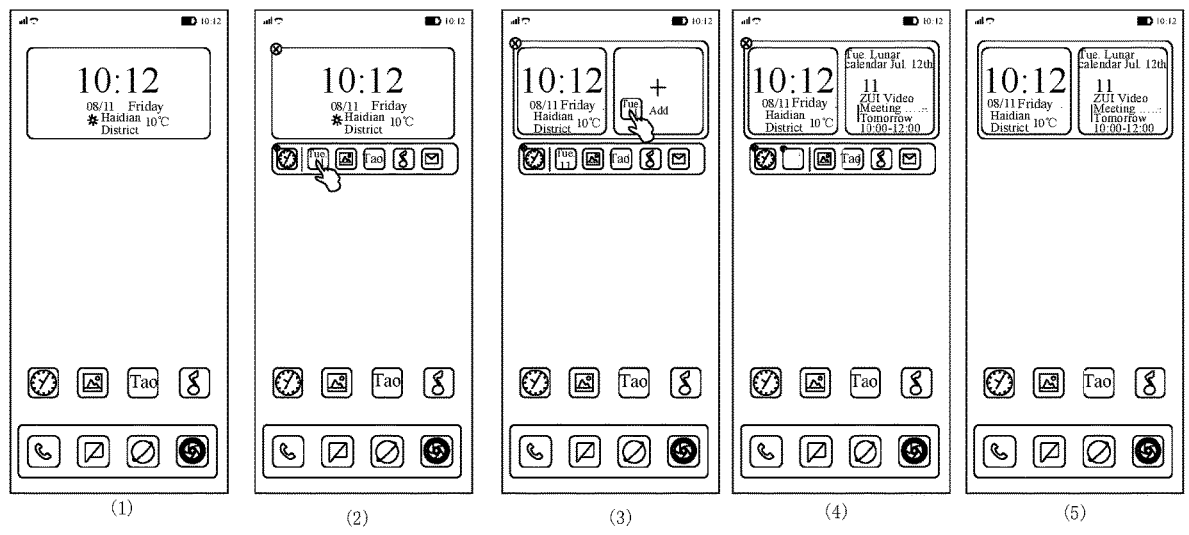
FIG. 8 is a schematic diagram of another display interface of an information processing method according to an embodiment of the disclosure.

FIG. 8 is a schematic diagram of another display interface of the information processing method consistent with the disclosure. In some embodiments, part (1) of FIG. 8 shows a default setting of the weather widget in the target area on the electronic device. The user can long press the target area to set the target area in the editing mode (the target area shown in part (2) of FIG. 8 is in the editing mode). In the editing mode, when the user drags the app icon of the calendar widget in the target area, the target display mode can be determined as the second target display mode. Before the calendar widget is dragged, there is merely the weather widget in the target area, such that the area to-be-divided can be the entire target area. The location of the app icon of the calendar widget in the third area of the target area can be determined, and according to the location in the third area and the dichotomy method, the target display manner can be determined. As shown in part (3) of FIG. 8, if the stay position is on the left side of the third area, when the target area is divided by the dichotomy method, the weather widget and the calendar widget can be displayed in the left-right division manner. Part (4) of FIG. 8 shows a display diagram when displaying the weather widget and the calendar widget in the left-right division manner. At this time, part (4) is still in the editing mode, and the user can click the target area again to cause the target area to exit the editing mode. Part (5) of FIG. 8 is the display diagram showing the weather widget and the calendar widget after exiting the editing mode.

Figure 9:
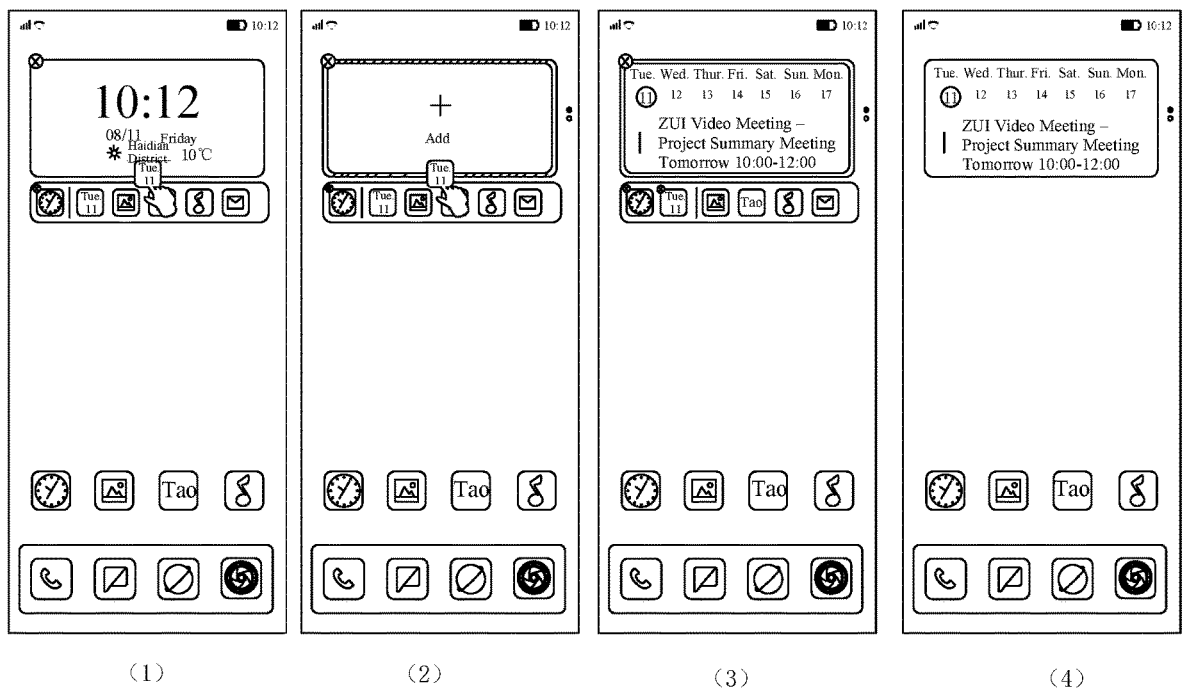
FIG. 9 is a schematic diagram of another display interface of an information processing method according to an embodiment of the disclosure.

FIG. 9 is a schematic diagram of another display interface of the information processing method consistent with the disclosure. Part (1) of FIG. 9 shows the display area in the first target display mode, when the app icon of the calendar widget is dragged to the first edge (as shown in part (2) of FIG. 9), it is determined that the calendar widget is displayed in the first target display mode, such that there is no need to switch the current display mode of the target area. As shown in part (3) of FIG. 9, the display diagram of the calendar widget is displayed in the first target display mode, and the target area is still in the editing mode at this time. As shown in part (4) of FIG. 9, the user can click on the target area to exit the editing mode and exit the editing mode.

Figure 10:
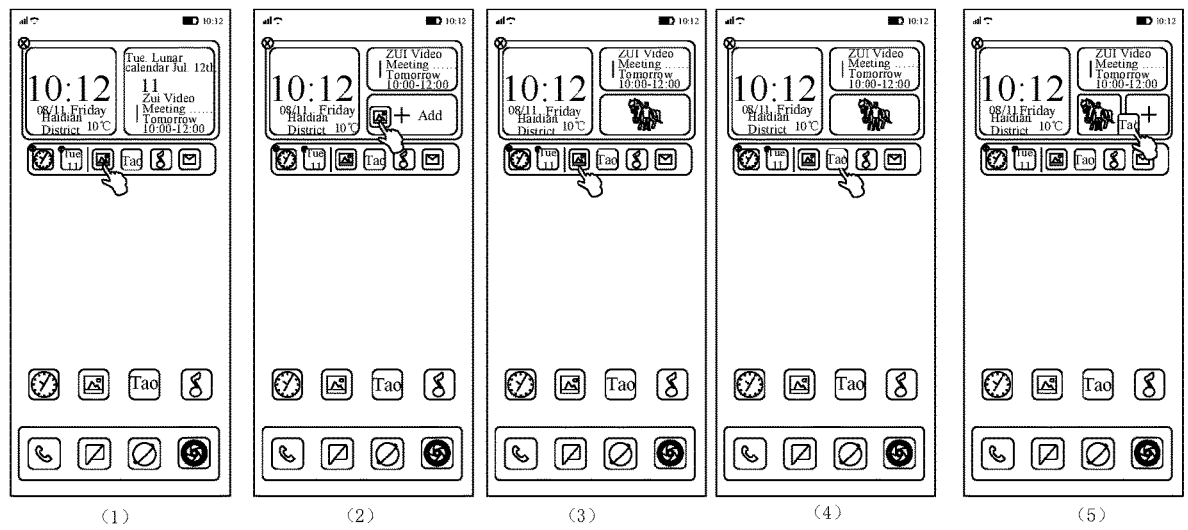
FIG. 10 is a schematic diagram of another display interface of an information processing method according to an embodiment of the disclosure.

FIG. 10 is a schematic diagram of another display interface of the information processing method consistent with the disclosure. Part (1) of FIG. 10 shows that the display area is in the second target display mode, and the target area can display the weather widget and the to-do list widget at this time. When the user drags the app icon of the video widget to the area where the to-do list widget is located in the target area, the area where the to-do list widget is located can be determined as the area to-be-divided and the stay position of the app icon of the video widget in the target area can be determined. As shown in part (2) of FIG. 10, when the stay position is on the left side of the third area, the area to-be-divided can be determined to be divided by the dichotomy method, and the to-do list widget and the video widget can be displayed in the top-bottom division manner. Part (3) of FIG. 10 is the display diagram showing the to-do list widget and the video widget. When the user further needs to drag a shopping widget to the target area, as shown in part (4) of FIG. 10, the user can drag the app icon of the shopping widget to the area where the video widget is located. The area where the video widget is currently located can be used as the to-be-divided area, and the shopping widget and the video widget can be displayed in the area to-be-divided according to the stay position of the app icon of the shopping widget in the third area. The third area can be determined according to the stay position, e.g., the third area corresponding to different stay positions can be different.

Figure 11:
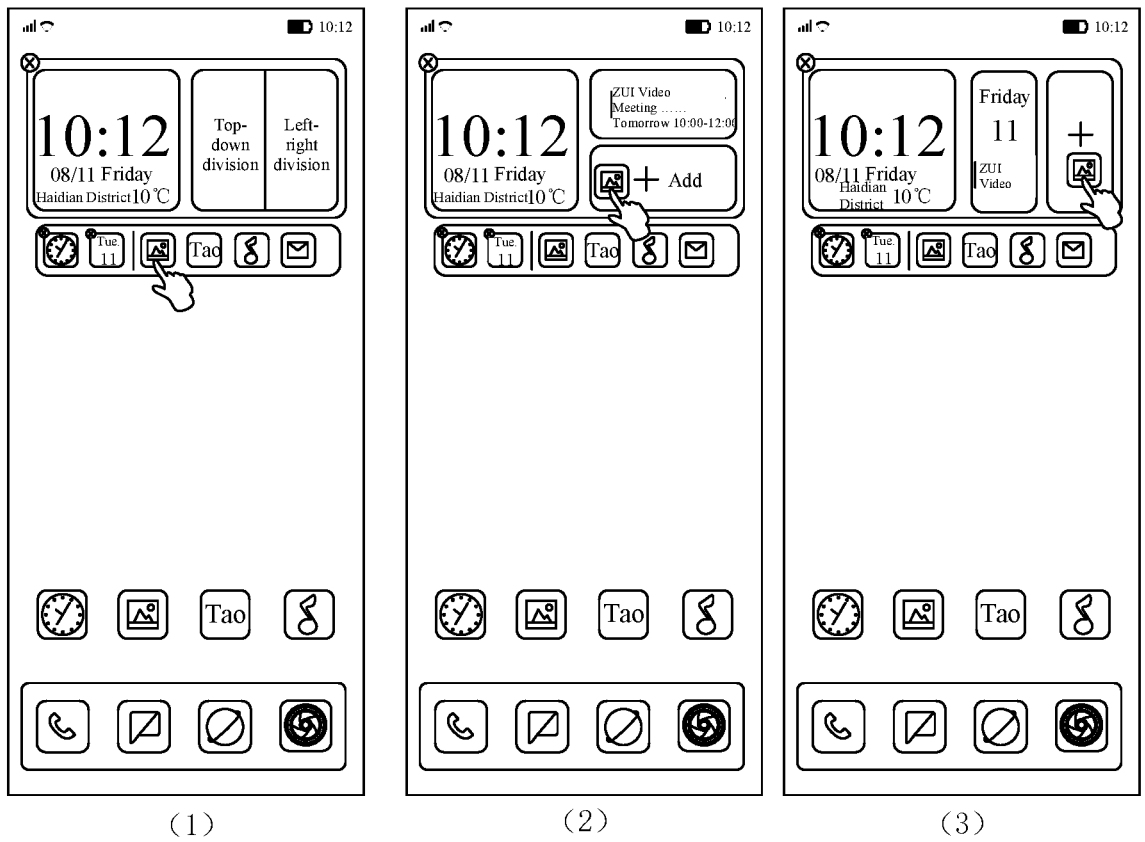
FIG. 11 is a schematic diagram of another display interface of an information processing method according to an embodiment of the disclosure.

FIG. 11 is a schematic diagram of another display interface of the information processing method consistent with the disclosure. Part (1) of FIG. 11 is the schematic diagram of the third area. It can be seen that the left side of the third area represents the upper-lower division manner, and the right side of the third area represents the left-right division manner. The widget currently displayed in the third area is the to-do list widget. When the app icon of the video widget is dragged to the left side of the third area, as shown in part (2) of FIG. 11, the to-do list widget and the weather widget can be displayed in the top-down division manner. When the app icon of the video widget is dragged to the right side of the third area, as shown in part (3) of FIG. 11, the to-do list widget and the weather widget can be displayed in the left-right division manner.

Figure 12:
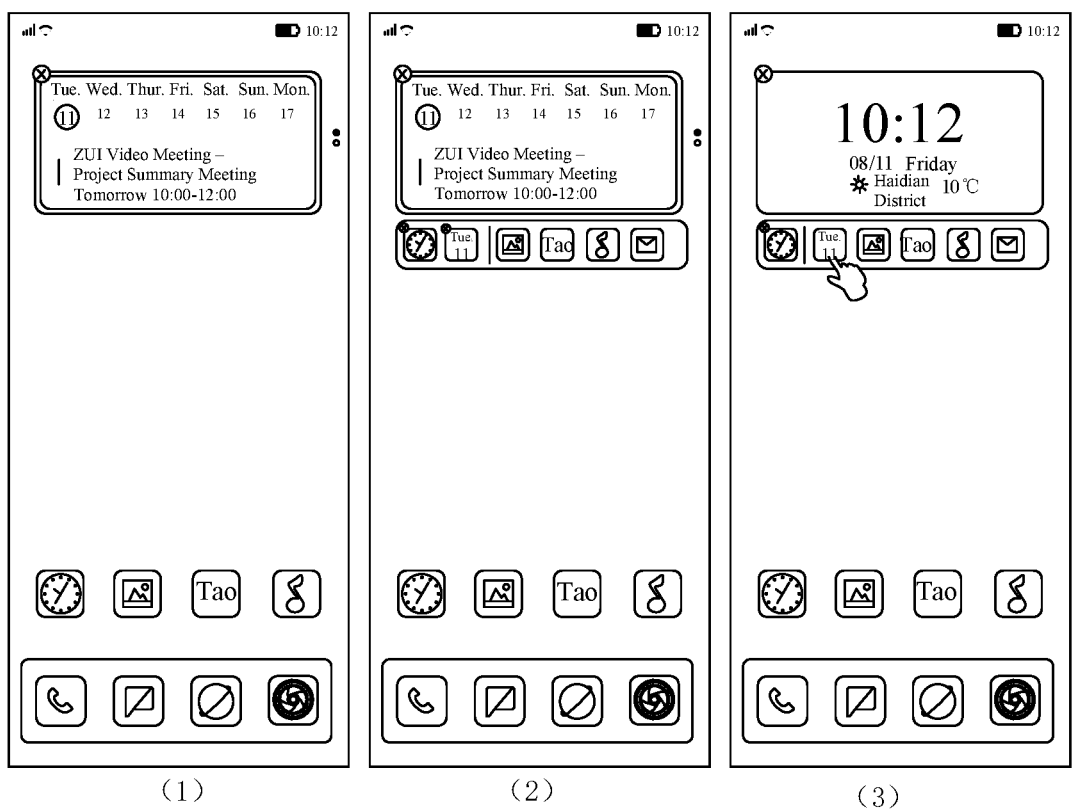
FIG. 12 is a schematic diagram of another display interface of an information processing method according to an embodiment of the disclosure.

FIG. 12 is a schematic diagram of another display interface of the information processing method consistent with the disclosure. Part (1) of FIG. 12 shows that the current target area is in the first target display mode, and the to-do list widget is displayed in the target area. As shown in part (2) of FIG. 12, when the user long presses the target area, the target area can be in the editing mode, and the user can delete the to-do list widget in the target area in the editing mode. As shown in part (3) of FIG. 12, after the user deletes the to-do list widget, the weather widget can be displayed in the target area.

Hereinafter, an automatic determination of target widgets and automatic switching of display modes will describe in detail with reference to application scenarios.

Figure 13:
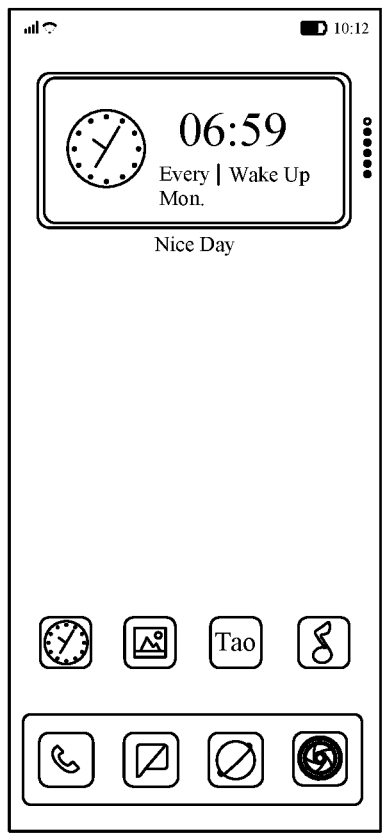
FIG. 13 is a schematic diagram of another display interface of an information processing method according to an embodiment of the disclosure.

FIG. 13 is a schematic diagram of another display interface of the information processing method consistent with the disclosure. In some embodiments, as shown in FIG. 13, the electronic device can display an alarm clock widget at 06:59 every Monday according to the historical display records of the plurality of widgets (the display mode of the target area is in the first target display mode at this time) and further automatically switch widgets according to the historical display records, for example, switch the alarm clock widget to another widget in the plurality of widgets.

Figure 14:
FIG. 14 is a schematic diagram of another display interface of an information processing method according to an embodiment of the disclosure.
Figure 15:
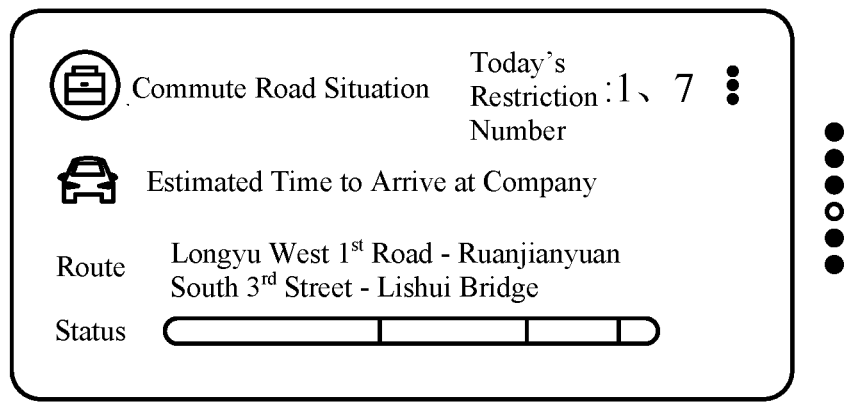
FIG. 15 is a schematic diagram of another display interface of an information processing method according to an embodiment of the disclosure.
Figure 16:
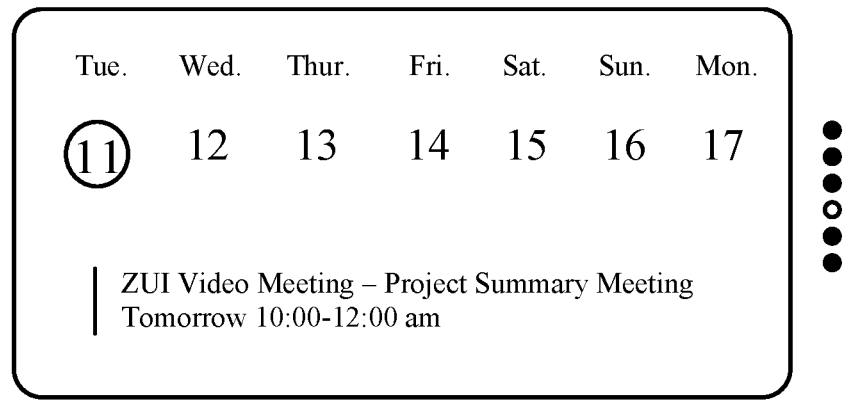
FIG. 16 is a schematic diagram of another display interface of an information processing method according to an embodiment of the disclosure.

FIGS. 14 to 16 are schematic diagrams of the display interfaces of the information processing method consistent with the disclosure. In some embodiments, as shown in FIG. 14, the electronic device can predict that the user needs to run in the morning after 7:00 am. At this time, the alarm clock widget can be switched to the device power widget, temperature widget and exercise widget, and the current first target display mode of the target area can be switched to the second target display mode, and the weather widget, temperature widget, and exercise widget can be displayed in the second target display mode. When the electronic device detects that the user's morning run is over, as shown in FIG. 15, at 9:00 am, the weather widget, temperature widget, and exercise widget can be switched to a traffic widget, and the current second target display mode of the target area can be switched to the first target display mode, and the traffic widget can be displayed for a period of time until it is switched. As shown in FIG. 16, at 10:00 am, the traffic widget can be automatically switched to the to-do list widget (e.g., a schedule widget).

For example, when detecting the time related to a recently set alarm clock, the electronic device can automatically switch the widget displayed in the target area to the alarm clock widget, which can last until the alarm clock ends and the user can be notified. When the to-do list widget is displayed, if no items need to be displayed, important notifications (such as logistics information of express delivery) can be displayed.

Detailed descriptions of the similar processes and content will be omitted herein.

Consistent with the disclosure, the information processing method can determine the target area, and the target area can be associated with the plurality of widgets. Unlike the conventional technologies, merely one widget is displayed at a time in the display area, thereby causing a problem of complex operation when the user is viewing the widgets, the method consistent with the disclosure can reduce the operational complexity when the user is viewing the widgets.

Figure 17:
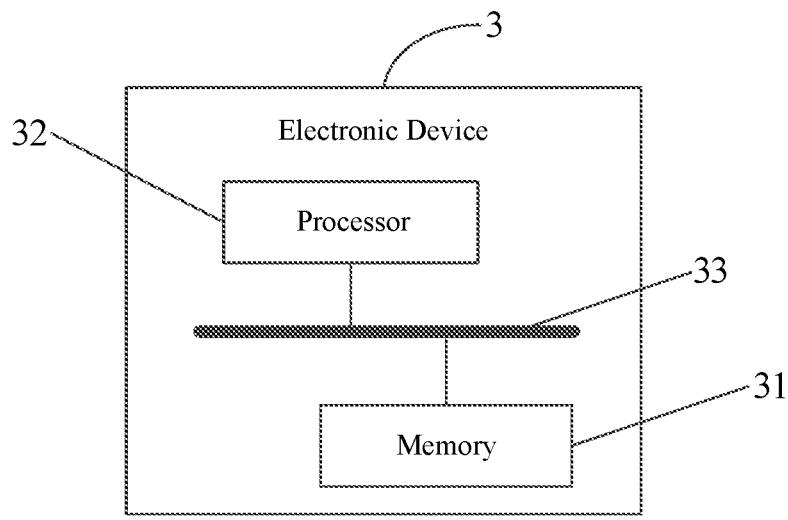
FIG. 17 is a schematic structural diagram of an electronic device according to an embodiment of the disclosure.

FIG. 17 is a schematic structural diagram of an electronic device 3 consistent with the disclosure. The electronic device 3 can implement the information processing method shown in FIGS. 1 and 2. As shown in FIG. 17, the electronic device 3 includes a memory 31, a processor 32, and a communication bus 33.

The communication bus 33 can be configured to establish a communication connection between the processor 32 and the memory 31.

The processor 32 can be configured to execute the information processing program stored in the memory 31 to determine the target area, the target area associated with the plurality of widgets, the plurality of widgets being different, and each widget obtaining the display content based on the target address, determine the target display mode of the target area, and display the plurality of widgets in the target area based on the target display mode.

In different target display modes, the plurality of widgets can be displayed differently in the target area.

In some embodiments, the processor 32 can be configured to execute the information processing program stored in the memory 31 to display the plurality of widgets in the target area based on the target display mode in order to implement the following processes. When the target display mode is the first target display mode, the widget can be displayed in the target area with the size of the target area. When the target display mode is the second target display mode, at least two widgets can be displayed in the target area with the size of the target area.

In some embodiments, the processor 32 can be configured to execute the information processing program stored in the memory 31 to display the plurality of widgets in the target area based on the target display mode in order to implement the following processes. The display size of the widget can be determined based on the target display mode and the size of the target area. In the target display mode, the widget can be displayed at the display size.

In some embodiments, the processor 32 can be configured to execute the information processing program stored in the memory 31 to receive the switching operation, and based on the switching operation, to switch the display mode of the target area from the current first target display mode to the second target display mode or switch the display mode of the target area from the current second target display mode to the first target display mode, or, based on the first association relationship between the plurality of widgets, to switch the display mode of the target area from the current first target display mode to the second target display mode or switch the display mode of the target area from the current second target display mode to the first target display mode.

In some embodiments, the processor 32 can be configured to execute the information processing program stored in the memory 31, based on the first association relationship between the plurality of widgets, to switch the display mode of the target area from the current first target display mode to the second target display mode or switch the display mode of the target area from the current second target display mode to the first target display mode, in order to implement the following processes. The target widget to be displayed can be determined, and the second association relationship between the target widget and the widget other than the target widget among the plurality of widgets can be determined. When the second association relationship indicates that the target widget has no relations with any widget other than the target widget among the plurality of widgets, the target display mode can be determined to be the first target display mode. When the current display mode of the target area is the second target display mode, the second target display mode can be switched to the first target display mode.

In some embodiments, the processor 32 can be configured to execute the information processing program stored in the memory 31, when the second association relationship indicates that the target widget is related to the widget other than the target widget among the plurality of widgets, to determine the target display mode as the second target display mode, and when the current display mode of the target area is the first target display mode, to switch the first target display mode to the second target display mode.

In some embodiments, the processor 32 can be configured to execute the information processing program stored in the memory 31 to determine the target display mode for the target area in order to realize the following processes. The user selection operation with respect to mode selection information of the target area is received, and the target display mode is determined based on the selection operation, or the target widget to be displayed is determined, and the second association relationship between the target widget and the widget other than the target widget among the plurality of widgets is determined. The target display mode is determined based on the operation process of associating the target area with the plurality of widgets.

In some embodiments, the processor 32 can be configured to execute the information processing program stored in the memory 31 to determine the target display mode based on the operation process of associating the target area with the plurality of widgets in order to realize the following processes. If the target area is in the editing mode, the stay position for adding the app ID of the target widget to the target area is determined. If the stay position coincides with the first edge of the target area, the target display mode is determined as the first target display mode. If the stay position is within the target area, the target display mode is determined as the second target display mode.

In some embodiments, the processor 32 can be configured to execute the information processing program stored in the memory 31, when the target display mode is the second target display mode, to display at least two widgets in the target area at the size of the target area, in order to achieved the following processes. When the target display mode is the second target display mode, the target display manner is determined based on the stay position and the target division manner. At least two widgets in the target area are displayed at the size of the target area.

In some embodiments, the processor 32 can be configured to execute the information processing program stored in the memory 31 to obtain the size of the display screen and the size of the widgets, determine the target size according to the size of the display screen and/or the size of the widgets, and determine the target area having the size equal to the target size.

The implementation processes executed by the processor are similar to those in the information processing methods shown in FIGS. 1 and 2, and detailed description will be omitted herein.

The device consistent with the disclosure can determine the target area and display the plurality of widgets in the target area. Unlike the conventional technologies, merely one widget is displayed at a time in the display area, thereby causing a problem of complex operation when the user is viewing the widgets, the device consistent with the disclosure can reduce the operational complexity when the user is viewing the widgets.

Figure 18:
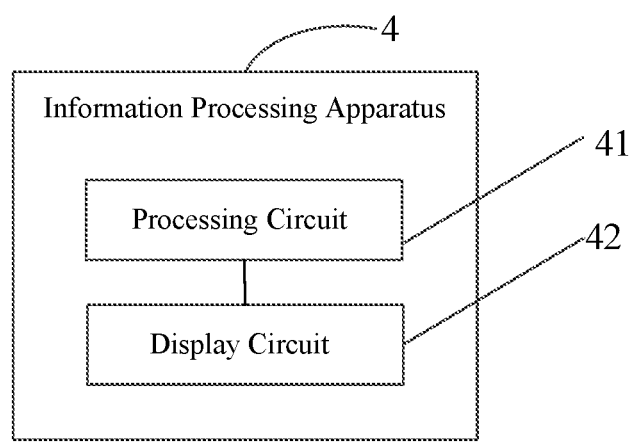
FIG. 18 is a schematic structural diagram of an information processing apparatus according to an embodiment of the disclosure.

FIG. 18 is a schematic structural diagram of an information processing apparatus 4 consistent with the disclosure. The information processing apparatus 4 can implement the information processing method shown in FIGS. 1 and 2. As shown in FIG. 18, the information processing apparatus 4 includes a processing circuit 41 configured to determine the target area, the target area associated with the plurality of widgets, the plurality of widgets being different, and each widget obtaining the display content based on the target address, and determine the target display mode of the target area, and a display circuit 42 configured to display the plurality of widgets in the target area based on the target display mode.

In different target display modes, the plurality of widgets can be displayed differently in the target area.

In some embodiments, the processing circuit 41 can be further configured to display the widget in the target area with the size of the target area, when the target display mode is the first target display mode, and display at least two widgets in the target area with the size of the target area, when the target display mode is the second target display mode.

In some embodiments, the processing circuit 41 can be further configured to determine the display size of the widget based on the target display mode and the size of the target area, and display the widget at the display size in the target display mode.

In some embodiments, the processing circuit 41 can be further configured to receive the switching operation, and based on the switching operation, to switch the display mode of the target area from the current first target display mode to the second target display mode or switch the display mode of the target area from the current second target display mode to the first target display mode, or, based on the first association relationship between the plurality of widgets, to switch the display mode of the target area from the current first target display mode to the second target display mode or switch the display mode of the target area from the current second target display mode to the first target display mode.

In some embodiments, the processor 32 can be configured to determine the target widget to be displayed and the second association relationship between the target widget and the widget other than the target widget among the plurality of widgets, to determine the target display mode as the first target display mode, when the second association relationship indicates that the target widget has no relations with any widget other than the target widget among the plurality of widgets, and to switch the second target display mode to the first target display mode, when the current display mode of the target area is the second target display mode.

In some embodiments, the processor 32 can be configured, when the second association relationship indicates that the target widget is related to the widget other than the target widget among the plurality of widgets, to determine the target display mode as the second target display mode, and when the current display mode of the target area is the first target display mode, to switch the first target display mode to the second target display mode.

In some embodiments, the processor 32 can be configured to receive the user selection operation with respect to mode selection information of the target area, determine the target display mode based on the selection operation, or determine the target widget to be displayed and the second association relationship between the target widget and the widget other than the target widget among the plurality of widgets, and determine the target display mode based on the operation process of associating the target area with the plurality of widgets.

In some embodiments, the processor 32 can be configured, if the target area is in the editing mode, to determine the stay position for adding the app ID of the target widget to the target area, if the stay position coincides with the first edge of the target area, to determine the target display mode as the first target display mode, and if the stay position is within the target area, to determine the target display mode as the second target display mode.

In some embodiments, the processor 32 can be configured to determine the target display manner based on the stay position and the target division manner, when the target display mode is the second target display mode, and display at least two widgets in the target area at the size of the target area.

In some embodiments, the processor 32 can be configured to obtain the size of the display screen and the size of the widgets, determine the target size according to the size of the display screen and/or the size of the widgets, and determine the target area having the size equal to the target size.

The interaction processes between circuits are similar to the processes in the information processing methods shown in FIGS. 1 and 2, and detailed description will be omitted herein.

The information processing apparatus consistent with the disclosure can determine the target area and display the plurality of widgets in the target area. Unlike the conventional technologies, merely one widget is displayed at a time in the display area, thereby causing a problem of complex operation when the user is viewing the widgets, the apparatus consistent with the disclosure can reduce the operational complexity when the user is viewing the widgets.

The present disclosure further provides a computer-readable storage medium storing one or more programs, and the one or more programs can be executed by one or more processors to realize the information processing method shown in FIGS. 1 and 2.

The computer-readable storage medium can include a Read-Only Memory (ROM), a Programmable Read-Only Memory (PROM), an Erasable Programmable Read-Only Memory (EPROM), an Electrically Erasable Programmable Read-Only Memory (EEPROM), a Magnetic Random Access Memory (FRAM), a Flash Memory, a Magnetic Surface Memory, a Compact Disc (CD), or a Compact Disc Read-Only Memory (CD-ROM) and other memories. The computer-readable storage medium can further include various electronic devices including one or any combination of the memories described above, such as mobile phones, computers, tablet devices, personal digital assistants, and the like.

The terms "including," "comprising," and variations thereof herein are open, non-limiting terminologies, which are meant to encompass a series of steps of processes and methods, or a series of units of systems, apparatuses, or devices listed thereafter and equivalents thereof as well as additional steps of the processes and methods or units of the systems, apparatus, or devices.

The serial numbers of the described embodiments of the present disclosure are merely for description, and not intended to indicate the advantages or disadvantages of the embodiments.

Through the description of the embodiments of the present disclosure, those skilled in the art can understand that the methods can be implemented by means of software plus a necessary general hardware platform or the hardware. The technical solution of the present disclosure can be embodied in the form of a software product, and the computer software product can be stored in a storage medium (e.g., a ROM/RAM, a magnetic disk, and an optical disk) including several instructions configured to cause a terminal device (e.g., a mobile phone, a computer, a server, an air conditioner, a network device, and the like) to execute the methods described in the various embodiments of the present disclosure.

The present disclosure is described with reference to flowcharts and/or block diagrams of methods, apparatus (systems), and computer program products according to embodiments of the present disclosure. It can be understood that each process and/or block in the flowcharts and/or block diagrams, and combinations of processes and/or blocks in the flowcharts and/or block diagrams, can be implemented by the computer program instructions. These computer program instructions may be provided to a processor of a general purpose computer, a special purpose computer, an embedded processor, or other programmable data processing device to produce a machine, such that instructions executed by a processor of a computer or other programmable data processing device can be used for implementing the functions specified in one or more flows of a flowchart and/or one or more blocks of a block diagram.

These computer program instructions may further be stored in computer readable memory capable of directing a computer or other programmable data processing device to operate in a particular manner, such that the instructions stored in the computer-readable memory can produce an article of manufacture including an instruction apparatus, and the instruction apparatus can implements the functions specified in the one or more flows of the flowcharts and/or the one or more blocks of the block diagrams.

These computer program instructions can further be loaded onto a computer or other programmable data processing apparatus to cause a series of operational processes to be performed on the computer or other programmable apparatus to produce the computer-implemented processes. Instructions executing on a computer or other programmable device thus can provide processes for implementing the functions specified in one or more flows of the flowcharts and/or one or more blocks of the block diagrams.

The above are merely example embodiments of the present disclosure, and are not intended to limit the scope of the present disclosure. All equivalent structures or equivalent process transformations made by using the contents of the description and drawings of this disclosure, or directly or indirectly applied in other related technical fields, should be included in the scope of this disclosure.

What is claimed is:

1. An information processing method comprising:
   determining a target area of a display screen, the target area being associated with a plurality of widgets, the plurality of widgets being different from each other, and each of the plurality of widgets obtaining a display content based on a target address;
   determining a target display mode of the target area, the target display mode being one of a plurality of different display modes, under which the plurality of widgets are displayed differently in the target area, wherein:
   the plurality of different display modes include:
      a first display mode in which one widget is displayed in the target area and occupies the entire target area; and
      a second display mode in which at least two widgets are displayed in the target area and together occupy the entire target area; and
   determining the target display mode includes:
      in response to a switch operation, determining a target widget to be displayed in the target area according to a first association relationship among the plurality of widgets, the target widget being one of the plurality of widgets;
      in response to there existing a second association relationship between the target widget and a related widget that is one of the plurality of widgets other than the target widget, determining that the target display mode is the second display mode; and
      in response to the second association relationship not existing between the target widget and any one of the plurality of widgets other than the target widget, determining that the target display mode is the first display mode; and
   displaying the one or more of the plurality of widgets in the target area according to the target display mode, including:
      in response to the target display mode being the first display mode, displaying the target widget in the target area according to the first display mode; and
      in response to the target area the target display mode being the second display mode, displaying the target widget and the related widget in the target area according to the second display mode.

2. The method according to claim 1, wherein determining the target display mode of the target area further includes:
   determining the target display mode further according to a user selection operation with respect to mode selection information of the target area, and determining the target display mode based on the selection operation; or
   determining the target display mode further based on an operation process of associating the target area with the plurality of widgets.

3. The method according to claim 2, wherein:
   determining the target display mode further based on the operation process of associating the target area with the plurality of widgets includes:
      in response to the target area being in an editing mode, determining a stay position for adding an application identification of the target widget to the target area;
      determining the target display mode to be the first display mode further in response to the stay position coinciding with an edge of the target area; and
      determining the target display mode to be the second display mode further in response to the stay position being within the target area; and
   displaying the target widget and the related widget in the target area according to the second display mode includes:
      determining a target display manner based on the stay position and a target division manner; and
      displaying the target widget and the related widget in the target area according to the target display manner.

4. The method according to claim 1, wherein determining the target area includes:
   obtaining a size of the display screen and sizes of the plurality of widgets;
   determining a target size according to at least one of the size of the display screen or the sizes of the plurality of widgets; and
   determining a size of the target area to be equal to the target size.

5. The method according to claim 1, further comprising:
   determining widgets having use frequencies greater than a target frequency as the plurality of widgets.

6. The method according to claim 1, wherein determining the target widget includes determining one of the plurality of widgets that has a highest display frequency as the target widget.

7. The method according to claim 4, wherein determining the target size includes determining an average of the size of the display screen and at least one of the sizes of the plurality of widgets as the target size.

8. An electronic device comprising:
   a memory storing an information processing program; and
   a processor configured to execute the information processing program to:

determine a target area of a display screen, the target area being associated with a plurality of widgets, the plurality of widgets being different from each other, and each of the plurality of widgets obtaining the display content based on a target address;

determine a target display mode of the target area, the target display mode being one of a plurality of different display modes, under which the plurality of widgets are displayed differently in the target area, wherein:

the plurality of different display modes include:
a first display mode in which one widget is displayed in the target area and occupies the entire target area; and
a second display mode in which at least two widgets are displayed in the target area and together occupy the entire target area; and determining the target display mode includes:
in response to a switch operation, determining a target widget to be displayed in the target area according to a first association relationship among the plurality of widgets, the target widget being one of the plurality of widgets;
in response to there existing a second association relationship between the target widget and a related widget that is one of the plurality of widgets other than the target widget, determining that the target display mode is the second display mode; and
in response to the second association relationship not existing between the target widget and any one of the plurality of widgets other than the target widget, determining that the target display mode is the first display mode; and display the one or more of the plurality of widgets in the target area according to the target display mode, including:
in response to the target area the target display mode being the first display mode, displaying the target widget in the target area according to the first display mode; and
in response to the target area the target display mode being the second display mode, displaying the target widget and the related widget in the target area according to the second display mode.

9. The device according to claim 8, further comprising:
a communication bus configured to establish a communication connection between the processor and the memory.

10. The device according to claim 8, wherein the processor is further configured to execute the information processing program to:
determine the target display mode further according to a user selection operation with respect to mode selection information of the target area, and determine a target display mode based on the selection operation; or
determine the target display mode further based on an operation process of associating the target area with the plurality of widgets.

11. The device according to claim 10, wherein the processor is further configured to execute the information processing program to:
in response to the target area being in an editing mode, determine a stay position for adding an application identification of the target widget to the target area;
determine the target display mode to be the first display mode further in response to the stay position coinciding with an edge of the target area;
determine the target display mode to be the second display mode further in response to the stay position being within the target area;
determine a target display manner based on the stay position and a target division manner; and
display the target widget and the related widget in the target area according to the target display manner.

12. The device according to claim 8, wherein the processor is further configured to execute the information processing program to:
obtain a size of the display screen and sizes of the plurality of widgets;
determine a target size according to at least one of the size of the display screen or the sizes of the plurality of widgets; and
determine a size of the target area to be equal to the target size.

13. The method according to claim 1, wherein displaying the target widget and the related widget in the target area includes:
displaying the target widget with a first size and the related widget with a second size in the target area, the second size being equal to the first size, the first size being equal to a half of a size of the target area.

14. The device according to claim 8, wherein the processor is further configured to execute the information processing program to:
display the target widget with a first size and the related widget with a second size in the target area, the second size being equal to the first size, the first size being equal to a half of a size of the target area.

* * * * *